US005531351A

United States Patent [19]
Logsdon

[11] Patent Number: 5,531,351
[45] Date of Patent: Jul. 2, 1996

[54] MULTI-FUNCTION DRUM CAP

[76] Inventor: Dana K. Logsdon, 400 1/2 W. Main St., Beardstown, Ill. 62618

[21] Appl. No.: 406,395

[22] Filed: Mar. 20, 1995

[51] Int. Cl.⁶ .............................. F16N 31/00; B65D 1/34
[52] U.S. Cl. ...................... 220/571.1; 220/573; 220/212; 220/203.11; 220/DIG. 6; 280/79.5; 184/106; 141/86; 141/319
[58] Field of Search .................................. 220/212, 601, 220/605, 606, 633, 635, 636, 571, 571.1, 573, 373, 374, DIG. 6, 203.11; 280/79.5; 251/144; 15/260–264; 184/106; 141/86–88, 319, 320, 322

[56] References Cited

U.S. PATENT DOCUMENTS

| | | |
|---|---|---|
| 3,258,178 | 6/1966 | Gran .................................. 220/254 X |
| 3,987,929 | 10/1976 | Mineo . |
| 4,231,488 | 11/1980 | Ward et al. . |
| 4,775,067 | 10/1988 | Mount .................................. 220/573 |
| 4,798,307 | 1/1989 | Evrard .................................. 15/264 X |
| 4,934,551 | 6/1990 | Budenbender . |
| 5,018,559 | 5/1991 | Branan . |
| 5,074,572 | 12/1991 | Delmerico et al. ................. 280/79.5 X |
| 5,183,280 | 2/1993 | Gresch .................................. 280/79.5 |
| 5,215,206 | 6/1993 | Siblik . |
| 5,291,921 | 3/1994 | Devine .................................. 141/86 |
| 5,292,140 | 3/1994 | Laing .................................. 280/79.5 |
| 5,472,220 | 12/1995 | Stephan .................................. 280/79.5 |

FOREIGN PATENT DOCUMENTS 3937038  10/1990  Germany .

Primary Examiner—Allan N. Shoap
Assistant Examiner—Nathan Newhouse
Attorney, Agent, or Firm—Richard C. Litman

[57] ABSTRACT

A multi-function drum cap which can be utilized as a weather protector, a drum funnel for filling or emptying the drum, and an oil drain pan for vehicles.

11 Claims, 3 Drawing Sheets

MULTI-FUNCTION DRUM CAP

BACKGROUND OF THE INVENTION

1. Field of the Invention

The present invention relates to a versatile drum cap which can be utilized for various functions such as: a drum cap which protects large commercial drums from inclement weather; by inversion of the cap to use as a funnel to fill drums; and a drain pan for emptying almost empty drums or emptying of transmission or engine oil of vehicles.

2. Description of the Prior Art

The prior art of interest is discussed in the order of its perceived relevance and the disclosure of each prior art is incorporated by reference.

U.S. Pat. No. 5,018,559 issued on May 28, 1991, to Larry J. Branan describes an industrial funnel which fits on and within the top rim of a 55 gallon drum. The funnel has a circular frame with a partitioned region feeding the fluid into a spout which fits within the bung hole. The partitioned region has a hinged cover having a disk supported on a rod positioned on the inside of the lid to plug the spout when the cover is closed. The hinged cover has several supporting ribs on top. The covered funnel is suitable only for adding liquids and as a temporary cover.

German patent application No. DE 3,937,038 C1 published on Oct. 31, 1990, for Johannes Lobbert describes a drum funnel having a separate compartment with a sieved bottom leading to a spout inserted in the bung hole. The compartment has a separate rotatable cover which is rotated horizontally by means of a centrally located pivot bolt. The funnel has a sloped side supporting handle loops and the bottom fits within the top rim of the drum. This covered funnel is suitable only for adding liquids and as a temporary cover.

In U.S. Pat. No. 4,934,551 issued on Jun. 19, 1990, to Bernd Budenbender, a cover for emptying bung containing drums is described. The metal cover disk has a flange which is either folded over or welded to the drum's rim. Nipples are welded to the apertures over both bung holes but do not extend beyond the cover disk into the bung holes. There is no suggestion for utilizing the cover for a funnel.

U.S. Pat. No. 3,987,929 issued on Oct. 26, 1976, to Kinji Mineo, describes a plastic cap seal for the exposed plugs of drums. The flexible plastic seal is made of either polypropylene, polyethylene, nylon, polystyrene or polyvinyl chloride.

In U.S. Pat. No. 4,231,488 issued on Nov. 4, 1980, to William H. Ward et al., a metal closure spout is welded by either a laser beam or an electron beam method.

Lastly, U.S. Pat. No. 5,215,206 issued on Jun. 1, 1993, to Allen D. Siblik, describes a closure ring assembly for securing a cover of a storage drum container.

None of the above inventions and patents, taken either singly or in combination, is seen to describe the versatility of the instant invention as claimed.

SUMMARY OF THE INVENTION

Accordingly, it is a principal object of the invention to provide a multi-function drum cap for covering, filling or emptying large commercial drums.

It is another object of the invention to provide a drum cap to cover large commercial drums to protect the tops from inclement weather.

It is a further object of the invention to provide a funnel for filling large commercial drums.

Still another object of the invention is to provide a collection pan when draining fluid contents of large commercial drums.

It is another object of the invention to provide an oil drain pan for collecting transmission or engine oil from a vehicle.

It is a final object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
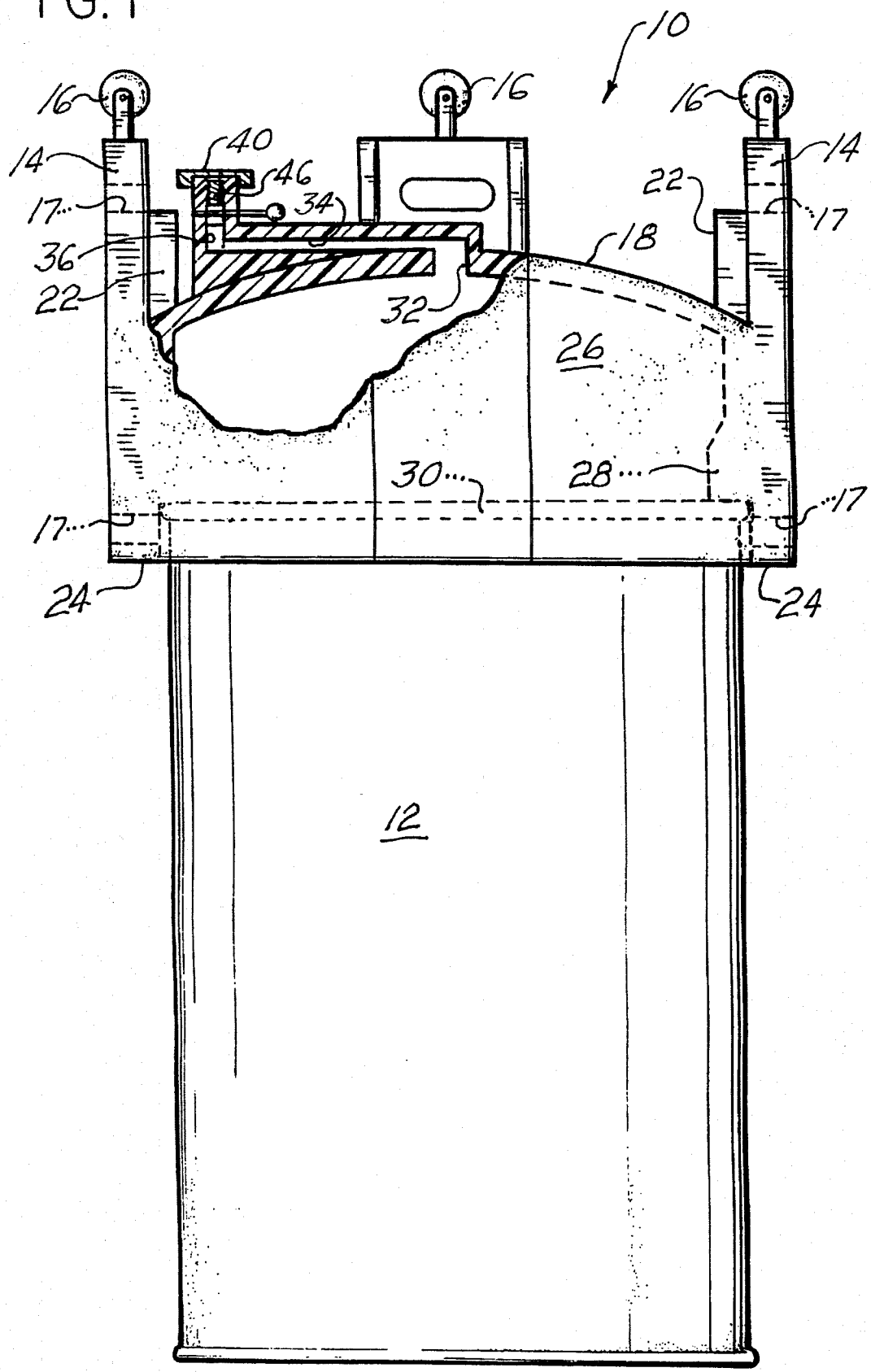
FIG. 1 is front view of a first embodiment of the multi-function drum cap having a partial cutaway view and positioned on a large capacity drum.

The present invention provides a cap for commercially available 15, 30 or 55 gallon drums or the like. The drum cap has various applications due to its unique structure. The first embodiment is illustrated in FIG. 1 as a protective cap 10 for a drum 12 having four legs 14 equidistantly spaced from each other at the periphery of drum cap 10. As many as six legs 14 equidistantly spaced are contemplated. Each leg 14 has a caster or wheel 16 on its top end which is removable, if preferred, when the legs require stability as a support on a surface. Legs 14 have convenient handhold apertures 17 located proximate to the caster to enable removal of the drum cap 10. Drum cap 10 has a domed or convex wall 18 which would be a concave wall when the cap is used as a receptacle.

The sidewall or side border 20 abuts each leg 14 and has a thickened first stop portion or region 22 which does not extend to the rim 24 of bowl 26. First stop regions 22 are all the same height and will be functional when drum cap 10 is inverted for another use. Similarly, a thickened second stop portion or region 28 is formed abutting the inside surface of each leg 14 from the domed wall 18 to proximate the end of the leg 14. Second stop regions 28 are of equal height and rest on rim 30 of drum 12. Above second stop regions 28, handhold apertures 17 are located in each leg 14 to enable lifting of a filled drum cap 10. Drum cap 10 should have friction fit with drum 12; thus, different drum cap sizes are provided for each of 15, 30 and 55 gallon drums.

Figure 2:
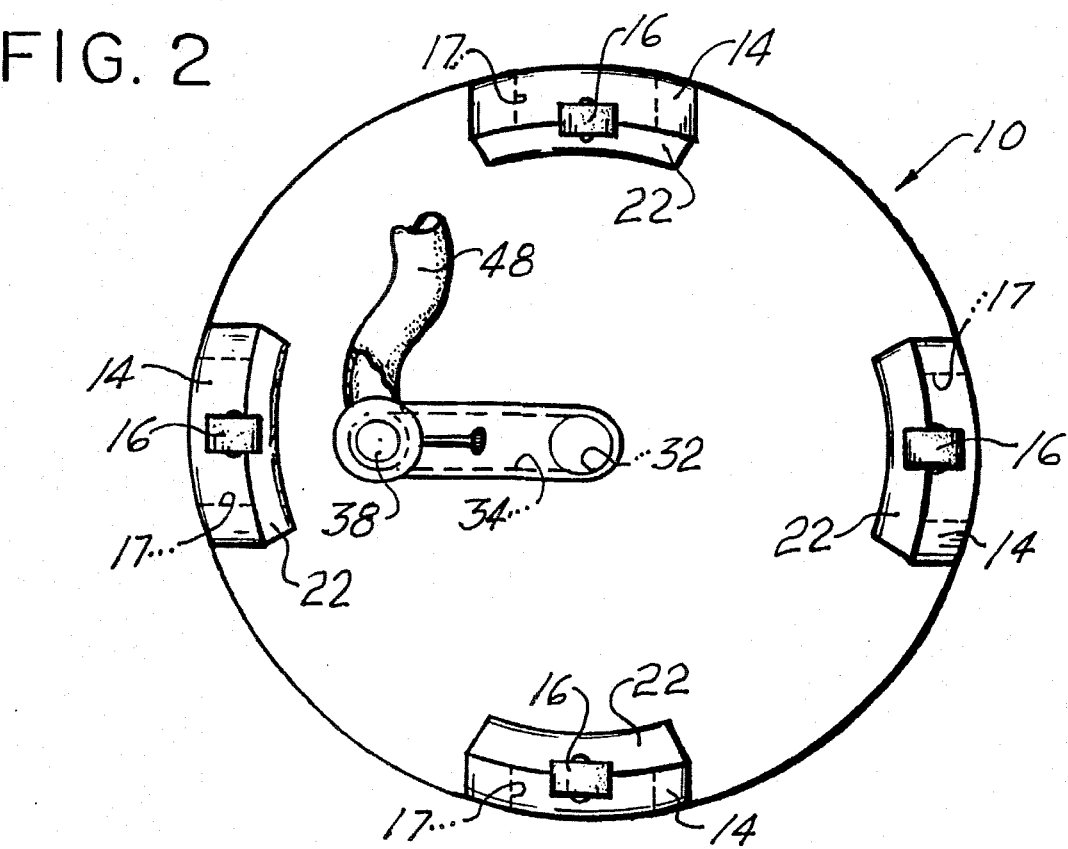
FIG. 2 is a plan view of the drum cap with an attached hose partially broken away to expose the ball valve.

Domed wall 18 has a central aperture or drain hole 32 from which extends a horizontal duct 34 leading to a vertical duct 36 having a metal or plastic ball valve 38 (see also FIG. 2) and a threaded duct cover 40. Vertical duct 36 has external threading which mates with the internal threading of duct cover 40. Vertical duct 36 advantageously has internal threading 46 for attaching a hose 48 when the drum cap 10 is turned upside down to drain any of its contents in bowl 26 as illustrated in the top view of drum cap 10 in FIG. 2. The drum cap 10 thus protects the top surface of drum 10 from inclement weather, dust, sun, etc. Drum cap 10 is substantially plastic except for ball valve 38 which can be either metal or plastic. Suitable plastic compositions are polyethylene, polypropylene, nylon, polystyrene, and polyvinyl chloride. The preferred plastic composition of drum cap 10 is polyethylene.

Figure 3:
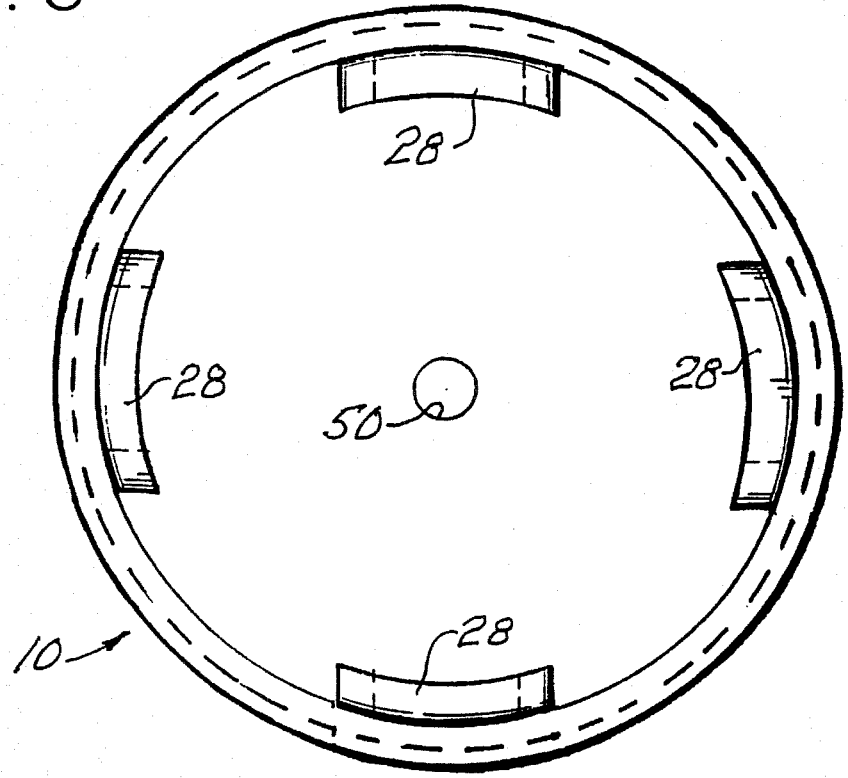
FIG. 3 is a bottom view of the drum cap.

Turning to FIG. 3, the bottom view of drum cap 10 shows the central placement of aperture 50 in bowl 26 (to permit drainage of collected liquid) and second stop regions or portions 28.

Figure 4:
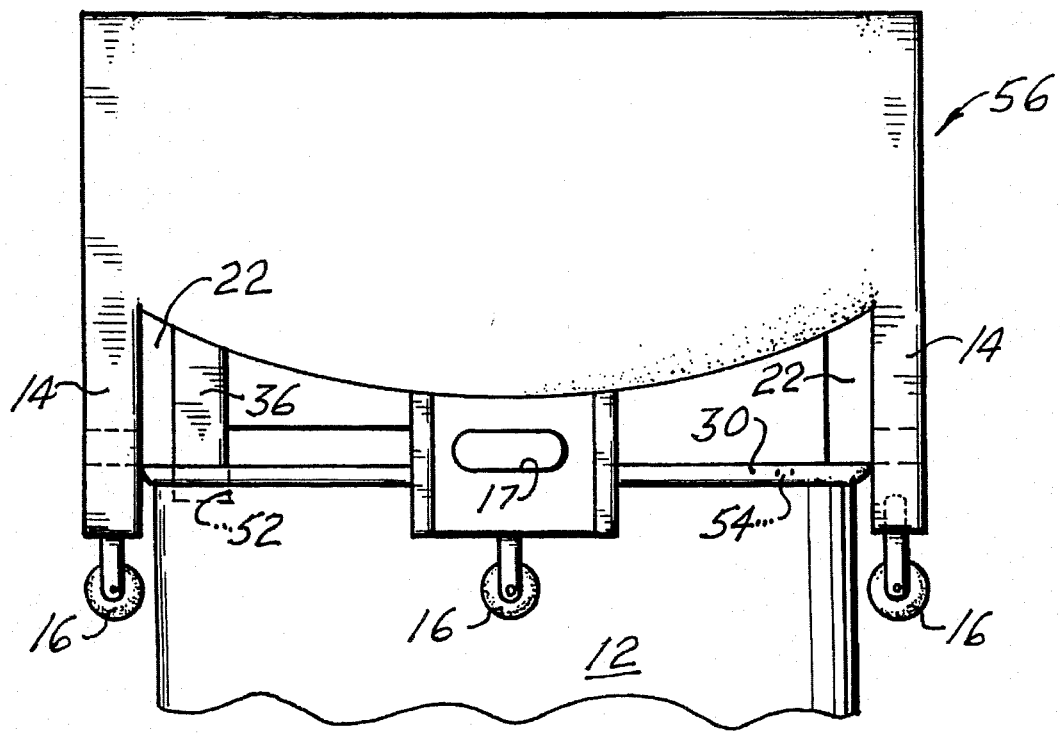
FIG. 4 is a side view of the inverted drum cap used as a funnel in a second embodiment.
Figure 5:
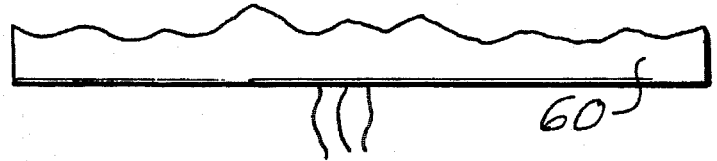
FIG. 5 is a side view of a third embodiment wherein the drum cap is inverted and used as an oil drain pan collecting oil from a vehicle's oil reservoir.
Figure 5:
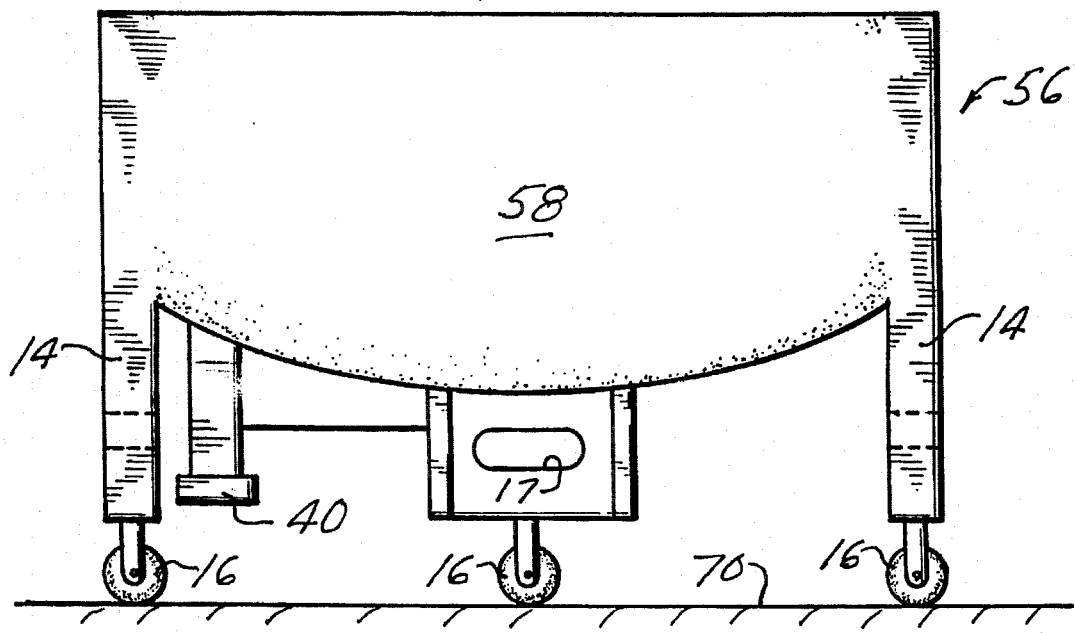

FIG. 4 is drawn to a second embodiment of the invention, wherein drum cap 10 is placed upside down over a drum 12. Second stop regions 28 on the inside of legs 14 rest advantageously on the rim 30 of drum 12 to maintain proper clearance of the domed wall 18 from the drum 12 and to permit penetration of the vertical duct 36 into the first bung hole 52 which, ordinarily, has a diameter of about 2 inches. Vertical duct 36 is positioned freely within the first bung hole 52. Vertical duct 36 is not threaded into the first bunghole 52, because it has a diameter slightly less than the inside diameter of the first bung hole 52. Located diametrically from the first bung hole 52 is a plugged second bung hole 54 having an approximate diameter of ¾ inch. In this position, drum cap 10 is utilized as a funnel 56 for the addition of fluids to a drum 10. The funnel 56 frictionally fits the drum 12 by virtue of the legs 14 contacting the rim 30 of drum 12.

FIG. 4 is drawn to the third embodiment of the invention in that funnel 56 is utilized as a drain pan 58 to accept used oil from a vehicle's transmission pan or engine oil pan 60. The bowl 26 is large enough to handle large amounts of spent oil. Duct cover 40 is in place. Caster or wheels 16 can be removed for this operation if more stability on ground surface 70 is desired and/or when it is inclined.

It is to be understood that the present invention is not limited to the embodiments described above, but encompasses any and all embodiments within the scope of the following claims.

I claim:

1. A multi-function drum cap comprising;

a circular domed region which has an extended side border which frictionally abuts a drum top;

said circular domed region being bordered by at least four legs having raised ledges acting as first stop regions on the inside and situated on an upper surface of said circular domed region, said legs situated equidistantly from each other;

said at least four legs extending below said extended side border of said circular domed region to frictionally abut a rim of a drum top, wherein each leg has a removable caster;

a vertical pipe portion situated proximate to an edge of said circular domed region and having a horizontal extension extending to a center of said circular domed region and opening at a bottom surface of said circular domed region;

said vertical pipe portion containing a valve to control fluid flow passing through said vertical pipe portion; and a circumferentially located second stop region which is integral with said legs and said extended side border, whereby said multi-function drum cap can be utilized for the functions selected from a drum cap to protect a drum top from the elements, an oil drain pan for vehicles when turned upside down, and a drum funnel when turned upside down with or without a drum attached.

2. The multi-function drum cap according to claim 1, comprising six legs with removable casters spaced equidistantly from each other on said border.

3. The multi-function drum cap according to claim 1, comprising threaded regions formed inside and outside at the distal end of said vertical pipe portion.

4. The multi-function drum cap according to claim 3, further comprising, in combination, a fluid containing drum, said cap being arranged as a funnel by inserting said distal region of said vertical pipe portion to a bunghole of an empty drum by turning said drum cap upside down with said first stop regions abutting a top of said fluid containing drum, whereby said drum cap is used as a funnel to add fluids to the empty said drum.

5. The multi-function drum cap according to claim 3, comprising a cover threaded onto the outside threaded region of said vertical pipe portion, whereby said drum cap further protects the drum container or said drum cap can be turned upside down and used as a oil drain pan for vehicles.

6. The multi-function drum cap according to claim 3, comprising a threaded tube extension attached to said inner threaded region of said vertical pipe portion, whereby the drum cap when turned upside down is utilized as an oil drain pan for vehicles or as a funnel to permit fluid to empty from the drum cap.

7. The multi-function drum cap according to claim 1, wherein said valve is a ball valve.

8. The multi-function drum cap according to claim 7, wherein said ball valve is metallic.

9. The multi-function drum cap according to claim 1, wherein said drum cap is substantially plastic.

10. The multi-function drum cap according to claim 9, wherein said plastic is polyethylene.

11. The multi-function drum cap according to claim 1, wherein each leg has a handhold aperture.

* * * * *